United States Patent Office.

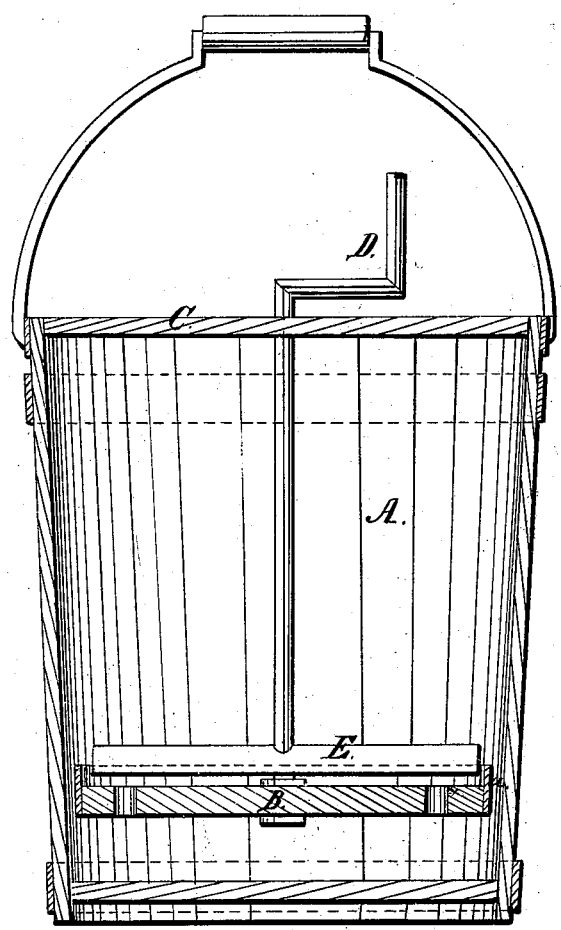
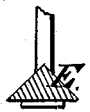

O. H. COOKE, OF MORRISVILLE, VERMONT.

Letters Patent No. 77,461, dated May 5, 1868.

IMPROVED POTATO-WASHER.

*The Schedule referred to in these Letters Patent and making part of the same.*

TO ALL WHOM IT MAY CONCERN:

Be it known that I, O. H. COOKE, of Morrisville, in the county of Lamoille, and in the State of Vermont, have invented certain new and useful Improvements in Potato-Washers; and do hereby declare that the following is a full, clear, and exact description thereof, reference being made to the accompanying drawings, and to the letters of reference marked thereon.

In the annexed drawings forming part of this specification, A represents the pail or bucket, in which the washer is put. B is the bottom of the washer, which is perforated to allow dirt, sand, or any other substance adhering to the potatoes to fall through to the bottom of the bucket. When raised up, the holes allow the water to run through. This bottom has a metal ring, $a$, around its periphery, extending a short distance above it, to hold the potatoes when raised out of the bucket. C is a wooden cross-piece to steady the washer at the top of the bucket. Through the centre of this cross-piece C, and through the bottom, B, is a crank, D, which turns the wooden float, E, which is fastened on the crank just above the perforated bottom B, and which, in revolving, washes the potatoes clean.

The float E has sharp edges, so that it may be turned either way without clogging, and, passing under the potatoes, causing them to rise and fall, will effectually clean them from all dirt.

Having thus fully described my invention, what I claim as new, and desire to secure by Letters Patent, is—

The combination of the perforated bottom B, with or without the metal ring around its periphery, with the sharp-edged float E, crank D, and wooden cross-piece C, made, and arranged, and operating substantially as and for the purposes above set forth.

In testimony that I claim the foregoing, I have hereunto set my hand, this 20th day of April, 1868.

O. H. COOKE.

Witnesses:
 A. A. YEATMAN,
 W. N. MARR.